United States Patent Office 3,131,068
Patented Apr. 28, 1964

3,131,068
WATER-SOLUBLE COATED EDIBLE
ORGANIC ACIDS
Martin Greif, Bronx, and Joseph Francis Weidenheimer, New City, N.Y., assignors to American Cyanamid Company, New York, N.Y., a corporation of Maine
No Drawing. Filed July 24, 1961, Ser. No. 125,945
1 Claim. (Cl. 99—139)

This invention relates to the coating of finely divided, edible organic acids which tend to cause agglomeration when included in dry food preparations, the coating being effective to inhibit this tendency. More particularly, the invention relates to the coating of finely divided, edible organic acids such as citric, ascorbic, adipic and fumaric acids with water-soluble hydroxypropyl methylcellulose, to the improved free-flowing powders thus obtained, and to the edible preparations containing them.

Citric and ascorbic acids are used extensively in the food industry. In the preparation of food products intended for aqueous reconstitution such as water-soluble gelatin preparations, pudding mixes, fruit flavored dried powders and other dry food preparations, it is often necessary to add edible organic acids to improve the taste, appearance, or solubility of the products in water. Citric acid is often added to such food preparations for the purpose of imparting an acidity or tartness to the final reconstituted product. Ascorbic acid is often added not only to improve the taste of a food preparation but also as a vitamin additive in fruit flavored dried powders. A serious problem has arisen from the use of citric and ascorbic acids in dry food preparations due to their corrosive qualities and chemical interaction with the other components of these preparations such as gelatin, sucrose, starch, etc. Citric acid in dry gelatin and pudding preparations interacts with the other components resulting in an off-color product which loses its free-flowing characteristics and often does not gel or solidify completely when reconstituted with water due to this deleterious action of the citric acid. Ascorbic acid in dry gelatin and pudding preparations usually imparts hygroscopic properties to the preparations rendering the shelf life of such preparations rather short.

In order to circumvent this problem of incompatability, the food industry has substituted adipic or fumaric acid in place of citric acid in dry food preparations. Although adipic and fumaric acids also chemically interact with the other components of dry food preparations, they do so to a lesser degree than citric and ascorbic acids. The shelf life of the dry food preparations is somewhat extended by the addition of adipic or fumaric acids in lieu of citric acid, but the final product has an off-taste which renders it less saleable. Another solution adopted by the food industry in the preparation of dry lemon pudding mixes, for instance, has been to introduce a tablet of citric acid into the package containing the pudding mix. The compressed citric acid tablet is apparently less corrosive to the dry pudding mix. However, considerable consumer resistance developed to the appearance of a tablet in this type of dry food preparation. Similar problems have been encountered with ascorbic acid.

Attempts to solve these problems have been made by coating citric acid particles with waxy hydrophobic material. It was found that the dry food preparations were quite stable but when the dry powders were reconstituted with hot water to form a gelatin dessert, for example, the water-insoluble glyceride wax coating material floated to the surface and formed an unappealing scum upon the surface of the finished gelatin dessert.

According to the present invention, the problem of coating edible organic acid particles so as to render the coated particles completely water-soluble and also non-corrosive to the other constitutents in dry food preparations is solved by a plurality of thin coatings of water-soluble hydroxypropyl methylcellulose. The plurality of thin coatings of hydroxypropyl methylcellulose may be obtained by alternately spraying the hydroxypropyl methylcellulose dissolved in a suitable inert volatile solvent onto the acid particles in a rotating tablet coating pan, evaporating the solvent by blowing warm air over the tumbling particles, and repeating the cycle until the desired thickness of coating is obtained. The same weight of hydroxypropyl methylcellulose applied in a single coating is not satisfactory due to clumping and agglomeration of the partially coated acid particles in the coating pan. However, a satisfactory single coating may be obtained by spray drying a suspension of an edible organic acid in a solution of hydroxypropyl methylcellulose in a suitable inert volatile solvent.

The water-soluble hydroxypropyl methylcellulose employed as a coating according to the present invention occurs as a white, fibrous or granular powder which swells in water to produce a clear to opalescent, colloidal solution. In the manufacture of hydroxypropyl methylcellulose, cellulose fibers are first swelled by a caustic soda solution to produce alkali cellulose, which is in turn treated with methyl chloride and propylene oxide to produce the hydroxypropyl methylcellulose. The fibrous reaction product is then purified and ground to a fine uniform powder or granulated. In discussing the number of substitutent groups on the anhydroglucose rings of cellulose, it is possible to speak in terms of weight percent and of degree of substitution. Knowledge of the number of points of attachment of substituent groups is usually more informative and important than knowledge of the weight of these groups. Cellulose chemists, therefore, use the term "degree of substitution." If all three available positions on each anhydroglucose ring are substituted, the degree of substitution is designated as three; if an average of two on each ring are reacted, the degree of substitution is designed as two, etc. Water-soluble hydroxypropyl methylcellulose contains a degree of substitution of not less than 1.08 and not more than 1.82 as methoxyl group ($-OCH_3$), and not less than 0.07 and not more than 0.30 as hydroxypropyl group $$(-OC_3H_6OH)$$

calculated on the anhydrous basis. By controlling the chain length of the alkali cellulose, it is possible to produce hydroxypropyl methylcellulose in a wide range of viscosities. In describing the viscosities of hydroxypropyl methylcellulose, the absolute viscosities (in centipoises) of 2% aqueous solutions at 20° C. are used. In practicing the present invention, hydroxypropyl methylcellulose in a broad range of viscosities from about 10 to 4,000 centipoises may be used. However, hydroxypropyl methylcellulose in a range of viscosities from about 10 to about 1000 centipoises is preferred. Hydroxypropyl methylcellulose conforming to the above specifications is obtainable under the brand names Methocel 60 HG, Methocel 65 HG, and Methocel 70 HG from the Dow Chemical Company. Various mixtures of different preparations of hydroxypropyl methylcellulose may also be employed in the practice of the present invention provided the resultant average degrees of substitution and average viscosities fall within the above specifications.

The number of thin coatings of hydroxypropyl methylcellulose, which is usually measured by the total percentage by weight of the coating material on the edible organic acid, is not sharply critical and the range that is useful is not identical for all purposes. In general, however, the irreducible minimum of hydroxy-propyl methylcellulose coating is about 0.5% by weight of the acid particles. Strictly speaking, there is no upper limit of the amount of hydroxypropyl methylcellulose coating material which may be employed. However, no improvement is obtained beyond 20% by weight and so for practical purposes this represents a useful upper limit. Larger amounts are not excluded from the invention, but as they have no practical advantage over 20% by weight, they will normally not be used.

The solvent to be employed in the coating operation presents primarily a physical problem. It must be a good solvent for hydroxypropyl methylcellulose but a poor solvent for the edible organic acids. If this latter requirement is not fulfilled, diffusion of the acids into the hydroxypropyl methylcellulose coating will be observed. Also, the solvent must not be highly toxic, or at least any minute residue should not be highly toxic, since the coated acids are intended for use in edible compositions. Volatility is important. Theoretically, even only moderately volatile solvents for the hydroxypropyl methylcellulose could be used. However, it is not practical to dry or evaporate the solvent at an excessive temperature. For practical purposes, it is desirable to effect the drying at temperatures not substantially in excess of 50° C. It should be noted that the temperature of the warm air used in drying may be somewhat higher than the actual temperature on the surface of the acid particles, as the evaporation of the solvent exerts a cooling effect. It is desirable to use an inert solvent or solvent-pair which has a boiling point not greatly in excess of 100° C. and preferably below 100° C. Suitable single solvents are, for example, chloroform and ethylene dichloride. Suitable solvent-pairs are, for example, 1,1,1-trichloro-ethane-methanol, chloroform-ethanol, and chloroform-methanol. The amount of solvent is, of course, not critical. Naturally, the solution must be thin enough so that it can be satisfactorily sprayed to form a thin coating, but this is a purely physical problem and represents no critical factor. The particle size of the edible organic acids is also not critical. However, edible organic acids having a particle size coarser than 100 U.S. Standard mesh is preferred and a particle size range of from 25 to 100 U.S. Standard mesh gives the best results.

The invention will be described in conjunction with the following specific examples.

Example 1

In an 18 inch diameter conventional tablet coating pan was placed 6 kg. of 25/100 mesh citric acid. A coating solution consisting of 310 g. of Methocel 60 HG (50 cps.) dissolved in a binary mixture of 5 liters of 1,1,1-trichloro-ethane and 5 liters of methanol was prepared. The coating solution was then sprayed onto the particles of citric acid from a conventional paint spray gun at 10–15 pounds per square inch pressure, 1.5–2.0 cubic feet per minute air flow, and 0.04 inch fluid nozzle orifice. The spray pattern was cone shaped. During the spraying process, a cycle was used whereby the particles of citric acid were sprayed for about 2 minutes and then were tumbled in a stream of warm air adjusted to maintain the temperature of the particles at 30–35° C. for about 2 minutes. This intermittent spraying and drying cycle was continued until about 2 liters of the coating solution had been applied. At this point, 200 g. of coated citric acid was removed from the pan and labelled "Batch A." The spraying and drying cycle was again continued until an additional 2 liters of coating solution had been applied. Another 200 g. sample of coated citric acid was removed and labelled "Batch B." The balance of the coating solution was applied in like manner and the final product was removed and labelled "Batch C." All three batches were treated with 1% silica aerogel as an anti-caking agent.

Assay of the citric acid content of each batch was found to be:

| | Percent citric acid |
|---|---|
| Starting material | 99.1 |
| Batch A | 97.7 |
| Batch B | 95.9 |
| Batch C | 94.8 |

The above assay indicates that Batch A contains about 1.5% by weight of coating whereas Batch C contains about 4.5% by weight of coating.

Example 2

Batch A and Batch C were incorporated in experimental edible compositions as follows:

Sample I—Uncoated citric acid (5 g.), sucrose (5 g.), and gelatin (1 g.).
Sample II—Batch A (5 g.), sucrose (5 g.), and gelatin (1 g.).
Sample III—Batch C (5 g.), sucrose (5 g.), and gelatin (1 g.).
Sample IV—Same as Sample I but with a pledget of cotton impregnated with 1 ml. of water inserted in the neck of a tightly capped bottle containing the sample.
Sample V—Same as Sample II but with a pledget of cotton impregnated with 1 ml. of water inserted in the neck of a tightly capped bottle containing the sample.
Sample VI—Same as Sample III but with a pledget of cotton impregnated with 1 ml. of water inserted in the neck of a tightly capped bottle containing the sample.

All six samples were tightly capped and placed in a constant temperature cabinet at 56° C. for 48 hours, after which they were cooled to room temperature. The following observations were made:

Sample I—this sample was off-white and caked.
Sample II—this sample was dry, free-flowing and pure white.
Sample III—this sample was pure white in color with but slight evidence of caking.
Sample IV—this sample was completely brown and completely liquefied.
Sample V—this sample was slightly off-white, slightly liquefied and light brown at the surface only.
Sample VI—this sample was generally white in color with slight caking, and some liquefaction and light brown color at the surface only.

These observations indicate that both 1.5% by weight and 4.5% by weight of hydroxypropyl methylcellulose coating rendered the citric acid particles compatible with a gelatin formulation. When moisture was present, the samples containing the coated citric acid were only slightly moist and discolored at the surface.

Example 3

Batch A and Batch C were incorporated in experimental edible compositions as follows:

Sample I—Granulated sugar (75.6 g.), fine gelatin (7.5 g.), and uncoated citric acid (1.9 g.).
Sample II—Granulated sugar (75.6 g.), fine gelatin (7.5 g.), and Batch A (1.9 g.).
Sample III—Granulated sugar (75.6 g.), fine gelatin (7.5 g.), and Batch C (1.9 g.).

The dry ingredients were mixed and each sample was added to 240 ml. of hot water at 90° C. with agitation. An additional 240 ml. of cold tap water was added to each sample and each was stirred and placed in a refrigerator at 4° C. until gelled. All the gelled samples appeared and tasted alike indicating that the hydroxypropyl methylcellulose coating on the citric acid particles does not impair the flavor or the appearance of the final gelatin dessert.

Example 4

Batch A and Batch C were incorporated in experimental edible compositions as follows:

Sample I—Granulated sugar (75 g.), powdered cherry flavor (1.0 g.), FDC Red No. 2 (0.1 g.), and uncoated citric acid (2 g.).

Sample II—Granulated sugar (75 g.), powdered cherry flavor (1.0 g.), FDC Red No. 2 (0.1 g.), and Batch A 2 (g.).

Sample III—Granulated sugar (75 g.), powdered cherry flavor (1.0 g.), FDC Red No. 2 (0.1 g.), and Batch C (2 g.).

The dry ingredients were mixed and each sample was added to 450 ml. of cold tap water. All the reconstituted sampls appeared and tasted alike indicating that the hydroxypropyl methylcellulose coating on the citric acid particles did not impair the flavor or the appearance of the final fruit flavored drink.

Example 5

In a 16 inch diameter conventional tablet coating pan was placed 6 kg. of 25/100 mesh ascorbic acid. A coating solution consisting of 60 g. of Methocel 65 HG (4,000 cps.) dissolved in a binary mixture of 2.25 liters of chloroform and 2.25 liters of ethanol was prepared. The coating solution was then sprayed onto the particles of ascorbic acid from a conventional paint spray gun at 10–15 pounds per square inch pressure, 1.5–2.0 cubic feet per minute air flow, and 0.04 inch fluid nozzle orifice. The spray pattern was cone shaped. During the spraying process a cycle was used whereby the particles of ascorbic acid were sprayed for about 15 minutes and then were tumbled in a stream of warm air adjusted to maintain the temperature of the particles at 32–38° C. for about 3 minutes. This intermittent spraying and drying cycle was continued until all the coating solution had been applied. The coated ascorbic acid was allowed to air dry on pans at 10% relative humidity and 80° F. and then was treated with 1% silica aerogel as an anticaking agent. There was thus obtained dry, free-flowing coated ascorbic acid.

What is claimed is:

A free-flowing, powdered, edible organic acid selected from the group consisting of citric, ascorbic, adipic and fumaric, having a particle size coarser than 100 U.S. Standard mesh and having a plurality of thin coats of hydroxypropyl methylcellulose, said hydroxypropyl methylcellulose containing a degree of substitution of not less than 1.08 and not more than 1.82 as methoxyl group and not less than 0.07 and not more than 0.30 as hydroxypropoxyl group, the plurality of thin coats of hydroxypropyl methylcellulose being sufficient in number so that the total hydroxypropyl methylcellulose coating is at least 0.5% by weight of the edible organic acid.

References Cited in the file of this patent

UNITED STATES PATENTS

| | | |
|---|---|---|
| 2,111,342 | Waldeck | Mar. 15, 1938 |
| 2,121,397 | Downing et al. | June 21, 1938 |
| 2,887,440 | Greminger et al. | May 19, 1959 |
| 2,949,402 | Mehrabi-Nejad et al. | Aug. 16, 1960 |
| 2,956,926 | Greif | Oct. 18, 1960 |
| 2,984,572 | Barsel | May 16, 1961 |

FOREIGN PATENTS

| | | |
|---|---|---|
| 1,051,848 | Germany | Mar. 5, 1959 |
| 1,023,284 | France | Dec. 24, 1952 |